United States Patent [19]

Singh et al.

[11] Patent Number: 5,602,205
[45] Date of Patent: Feb. 11, 1997

US005602205A

[54] N-(SUBSTITUTED) MALEIMIDES AND COMPOSITIONS INCORPORATING THE SAME

[75] Inventors: Balwant Singh; Robert J. Tynik, both of Stamford, Conn.

[73] Assignee: Cytec Technology Corp., Wilmington, Del.

[21] Appl. No.: 430,051

[22] Filed: Apr. 27, 1995

Related U.S. Application Data

[60] Division of Ser. No. 185,425, Jan. 21, 1994, which is a continuation-in-part of Ser. No. 7,225, Jan. 22, 1993, Pat. No. 5,314,950.

[51] Int. Cl.$^6$ ............................. C08C 19/28; C07D 207/452
[52] U.S. Cl. ..................................... 525/282; 548/521
[58] Field of Search ........................... 548/521, 522; 525/282

[56] References Cited

U.S. PATENT DOCUMENTS

| | | | |
|---|---|---|---|
| 3,431,276 | 3/1969 | Nield et al. | 260/326 |
| 3,506,624 | 4/1970 | Behrens | 525/282 |
| 3,627,780 | 12/1971 | Bonnard | 548/521 |
| 3,652,726 | 3/1972 | Nield et al. | 260/376 |
| 3,676,404 | 7/1972 | Nield | 260/78 |
| 3,766,142 | 10/1973 | Nield et al. | 260/47 |
| 4,039,734 | 8/1977 | Hendy | 589/689 |
| 4,111,879 | 9/1978 | Mori et al. | 260/29.6 |
| 4,374,951 | 2/1983 | Lee et al. | 525/73 |
| 4,381,373 | 4/1983 | Ikuma | 525/194 |
| 4,404,322 | 9/1983 | Saito et al. | 525/74 |
| 4,408,010 | 10/1983 | Le-Khac | 525/73 |
| 4,464,520 | 8/1984 | Adams et al. | 526/262 |
| 4,564,683 | 1/1986 | Adams | 548/521 |
| 4,605,700 | 8/1986 | Le-Khac | 525/73 |
| 4,623,734 | 11/1986 | Kita et al. | 548/545 |
| 4,683,275 | 7/1987 | Kato et al. | 526/262 |
| 4,812,579 | 3/1989 | Dol et al. | 548/548 |
| 4,851,547 | 7/1989 | Kita et al. | 548/548 |
| 4,874,829 | 10/1989 | Schwier et al. | 526/262 |
| 4,879,343 | 11/1989 | Aoki et al. | 525/71 |
| 4,904,803 | 2/1990 | Fujita et al. | 548/548 |
| 4,914,138 | 4/1990 | Percec et al. | 525/71 |
| 4,954,571 | 9/1990 | Iwamoto et al. | 525/214 |
| 4,980,483 | 12/1990 | Kita et al. | 548/548 |
| 4,983,669 | 1/1991 | Piermattle et al. | 525/47 |
| 5,015,712 | 5/1991 | Newman | 526/347 |
| 5,025,060 | 6/1991 | Yabuta et al. | 524/533 |
| 5,028,651 | 7/1991 | Park et al. | 524/409 |
| 5,055,520 | 10/1991 | Percec et al. | 525/74 |
| 5,068,357 | 11/1991 | Tsumura et al. | 548/548 |
| 5,077,343 | 12/1991 | Newman | 525/293 |
| 5,091,470 | 2/1992 | Wolsink et al. | 525/71 |
| 5,136,052 | 8/1992 | Gysel et al. | 548/549 |
| 5,175,309 | 12/1992 | Tsumura et al. | 548/548 |
| 5,179,162 | 1/1993 | Kato | 525/148 |
| 5,227,429 | 7/1993 | Kawamura et al. | 525/92 |
| 5,262,488 | 11/1993 | Maly | 525/282 |

FOREIGN PATENT DOCUMENTS

| | | | |
|---|---|---|---|
| 872324 | 6/1971 | Canada . | |
| 0355624A2 | 2/1990 | European Pat. Off. . | |
| 104865 | 8/1981 | Japan | 548/521 |
| 093159 | 5/1986 | Japan | 548/521 |
| 62-36442 | 2/1987 | Japan . | |
| 64-79248 | 3/1989 | Japan . | |
| 1533067 | 11/1978 | United Kingdom . | |

OTHER PUBLICATIONS

Barrales–Reinda et al., "Free–Radical Copolymerizations of N–Phenyl Maleimide" *J. Macromol. SCI:Chem.*, A11(2), 267–286, (1977).

Hagiware et al., "Anionic Polymerization of N–Substituted Maleimide, 1/Polymerization of N–Phenylmaleimide", *Makromol, Chem. Rapid Commun.*, 6, 169–174 (1985).

Matsumoto et al., "Radical Polymerication of N–(Alkyl–substituted phenyl) maleimides: Synthesis of Thermally Stable Polymers Soluble in Nonpolar Solvents", *Macromolecules*, 1990, 23, 4508–4513.

Chemical Abstract 112(1):4341r.
Chemical Abstract 113(4):25107e.
Chemical Abstract 109(16):130219h.
Chemical Abstract 113(20):172952e.
Chemical Abstract 114(15):138033s.
Chemical Abstract 96(19):157434z.

*Primary Examiner*—David Buttner
*Attorney, Agent, or Firm*—Bart E. Lerman; Claire M. Schultz; Michael J. Kelly

[57] ABSTRACT

Novel polyfunctional maleimides as well as novel compositions based on mono- and polyfunctional maleimides are provided. Also provided are heat resistance resin compositions and curable compositions incorporating the same. The monofunctional maleimide is N-(2,3-dimethylphenyl)maleimide, and the polyfunctional maleimides are bis- and higher functional variations thereof.

12 Claims, No Drawings

N-(SUBSTITUTED) MALEIMIDES AND COMPOSITIONS INCORPORATING THE SAME

This is a divisional of application Ser. No. 08/185,425, filed Jan. 21, 1994, which is a continuation-in-part of application Ser. No. 08/007,225, filed Jan. 22, 1993, now U.S. Pat. No. 5,341,950.

BACKGROUND OF THE INVENTION

The present invention relates generally to N-(substituted) maleimides and, more specifically, to certain mono- and polyfunctional N-aryl maleimides, as well as to resins and other products incorporating the same.

A variety of N-substituted maleimides are known in the literature in a variety of uses. For example, bis-maleimides are well-known in composites, and bis- and higher-functional maleimides have been utilized as crosslinkers in a variety of applications.

Monofunctional N-alkyl and N-aryl maleimides have extensively been used to improve the heat stability of homo- and especially copolymers prepared from vinyl monomers. Typically, the bulk resins comprise ABS (poly-(acrylonitrile-co-butadiene-co-styrene)) or a polyblend of poly-(acrylonitrile-co-butadiene) and poly-(styrene-co-acrylonitrile); PVC (poly(vinyl chloride)); SAN (poly(styrene-co-acrylonitrile)); PMMA (poly-(methyl methacrylate)); and the like. The maleimides can be copolymerized with other monomers such as acrylonitrile, butadiene, styrene, methyl methacrylate, vinyl chloride, vinyl acetate and many other comonomers. A more preferred practice in the industry is to produce copolymers of maleimides with other monomers such as styrene and optionally acrylonitrile and to blend these with ABS and SAN resins. In any event, the polymer compositions are adjusted so that the copolymers are fully compatible with the bulk resins (e.g., ABS and/or SAN) as shown by the presence of a single glass transition point ($T_g$) as determined by differential scanning calorimetry (DSC). Maleimide-containing vinyl resins and their use in the manufacture of parts for automobiles, electrical and electronic machinery and appliances, because of their good heat resistance, impact resistance and moldability, are generally described, for example, in CA872324, JP-A-62036442, JP-A-62288655, JP-A-01079248, JP-A-02004810, JP-A-02147610, U.S Pat. No. 3,652,726, U.S. Pat. No. 3,676,404, U.S. Pat. No. 3,766,142, U.S. Pat. No. 4,039,734, U.S. Pat. No. 4,374,951, U.S. Pat. No. 4,381,373, U.S. Pat. No. 4,605,700, U.S. Pat. No. 4,683,275, U.S. Pat. No. 4,874,829, U.S. Pat. No. 4,879,343, U.S. Pat. No. 4,914,138, U.S. Pat. No. 4,954,571, U.S. Pat. No. 4,983,669, U.S. Pat. No. 5,028,651, U.S. Pat. No. 5,091,470 and U.S. Pat. No. 5,136,052. All of the above are incorporated by reference herein for all purposes as if fully set forth.

Among the numerous maleimides described in the literature for use in this application, N-phenylmaleimide (NPMI) appears to be the monomer of choice as it displays excellent properties as a material to improve heat resistance. The major drawbacks are its high toxicity and deep yellow color which can impart dark color to the finished molded articles, especially at high monomeric usage. Thus, compounds possessing the desirable properties of NPMI but without such drawbacks would be distinctly advantageous.

While it appears that a wide variety of N-((substituted-)phenyl)maleimides have been described in the literature as possible alternatives to NPMI, one that has not specifically been mentioned is N-(2,3-dimethylphenyl) maleimide. It has now been discovered that N-(2,3-dimethylphenyl) maleimide, a pale yellow to white solid, appears to be less toxic than NPMI. Further, it has been surprisingly discovered that homo- and copolymers of N-(2,3-dimethylphenyl) maleimide are readily compatible with ABS, SAN and a variety of other resins.

It should be noted that N-(2,3-dimethylphenyl) maleimide is, in and of itself, known and has been described for uses including, for example, in compositions for inhibiting adhesion of shellfish and algae (GB1533067 and U.S. Pat. No. 4,111,879) and as an antimicrobial agent (JP-A-02240002; Igarashi et al, *Nippon Kagaku Kaishi (9)*, 1616-19 (1989)). Homopolymers and copolymers of N-(2,3-dimethylphenyl) maleimide, however, have apparently not been specifically described, particularly for use in improving the heat resistance of bulk resins. In addition, bis- and higher-function variations of N-(2,3-dimethylphenyl) maleimides have apparently also not been specifically described.

SUMMARY OF THE INVENTION

The present invention, therefore, provides polyfunctional maleimides of the general formula

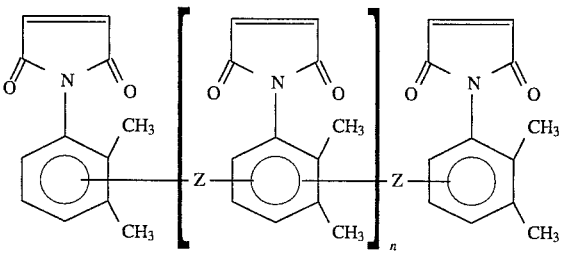

wherein n is 0 or larger, and preferably 0, 1 or 2; and

Z is selected from an alkylene group, an alkyl substituted alkylene group and a dialkyl substituted alkylene group, wherein the alkylene group is preferably methylene.

The present invention also provides compositions incorporating such polyfunctional maleimides as well as compositions incorporating N-(2,3-dimethylphenyl)maleimide, which has the following structure

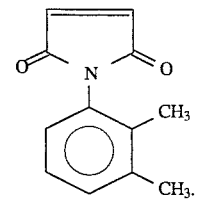

As a specific example thereof, the present invention provides homopolymers and copolymers of N-(2,3-dimethylphenyl)maleimide which find use, for example, in heat resistant resin compositions. It has been found that such homopolymers and copolymers are highly compatible with a variety of bulk resins (as measured by determining whether or not they dissolve in selected solvents, and by whether or not they have a single glass transition temperature, $T_g$) and, when incorporated into such bulk resins, elevate their heat resistance while retaining lower color.

As another example, the present invention provides curable compositions such as curable rubbers, coatings and molding compositions, in which the crosslinker comprises the polyfunctional maleimides of the above general formula.

As a specific example may be mentioned a curable composition for composite applications, in which the crosslinker comprises a bis-functional maleimide of the above general formula (n=0).

These and other features and advantages of the present invention will be more readily understood by those skilled in the art from a reading of the following detailed description.

DETAILED DESCRIPTION OF THE PREFERRED EMBODIMENTS

Preparation of Maleimides

The above mentioned mono- and polyfunctional maleimides can be prepared via well-known procedures such as described in previously incorporated U.S. Pat. No. 5,136, 052, as well as U.S. Pat. No. 3,431,276, U.S. Pat. No. 4,623,734, U.S. Pat. No. 4,812,579, U.S. Pat. No. 4,851,547, U.S. Pat. No. 4,904,803, U.S. Pat. No. 4,980,483, U.S. Pat. No. 5,068,357 and U.S. Pat. No. 5,175,309, all of which are also incorporated by reference herein as if fully set forth.

In preferred procedures, these maleimides can be prepared by reacting maleic anhydride with the appropriate mono-, bis- or higher-functional amine in an organic solvent such as xylene. The reaction may be catalyzed by a variety of acid catalysts such as sulfuric, phosphoric and sulfonic acids. Preferably, a supported or unsupported phosphoric acid is utilized, with recycle of the catalyst being preferable. Further details such as appropriate reaction times, temperatures and the like are in general well-known or readily derivable to those skilled in the relevant art and may be found, for example, in the aforementioned incorporated references.

In the preparation of N-(2,3-dimethylphenyl)maleimide, the appropriate amine is 2,3-dimethylaniline. In the preparation of the polyfunctional maleimides, the preferred amine is a dimer or oligomer which can be derived from 2,3-dimethylaniline via well-known procedures. As an example, such dimers and oligomers can be prepared by reacting 2,3-dimethylaniline with an aqueous formaldehyde solution in the presence of hydrochloric acid. The formation of dimers versus oligomers can be controlled by varying reaction conditions.

Polymers of N-(2,3-dimethylphenyl)maleimide and Uses Thereof

Homo- and copolymers (including graft copolymers) of the N-(2,3-dimethylphenyl) maleimide can be prepared by a variety of well-known bulk, solution, suspension, and emulsion polymerization techniques, either in batch or continuous processing, using catalytic systems such as free-radical generating peroxides or azo- containing catalysts, or redox systems, anionic catalysts, and the like, such as described in a number of the previously incorporated references. N-(2, 3-dimethylphenyl)maleimide can be used alone, which produces the corresponding homopolymers, or it can be mixed with other polymerizable comonomers including, for example, aromatic monoalkenyl monomers such as styrene and alpha-methylstyrene; vinyl cyano monomers such as acrylonitrile and methacrylonitrile; vinyl halide monomers such as vinyl chloride and vinylidene chloride; alkylester monomers of acrylic and methacrylic acid such as methyl methacrylate, methyl acrylate, 2-ethylhexyl methacrylate, and the like; and vinyl alkylester monomers.

Graft rubber copolymers may be prepared by polymerizing N-(2,3-dimethylphenyl)maleimide and optional other comonomers in the presence of a rubber polymer including, for example, butadiene type rubbers such as polybutadiene, isoprene type rubbers such as polyisoprene, copolymers of diene monomers and styrene such as styrene-co-butadiene, alkylacrylate rubbers and the like. The rubbers are preferably used in an amount of 5 to 70% by weight, more preferably 10 to 60% by weight, of the graft copolymer, and preferably they have a particle diameter of 0.1 to 1.5 micrometers, more preferably 0.2 to 0.9 micrometers. As an example of a suitable rubber may be mentioned a polybutadiene latex such as disclosed in U.S. Pat. No. 5,028,651 (also incorporated by reference herein for all purposes as if fully set forth), which can be grafted with N-(2,3-dimethylphenyl) maleimide and, optionally, other monomers such as styrene and acrylonitrile. The graft copolymer thus formed is useful to provide heat resistant polymer compositions which are not highly colored.

A particularly preferred use of such polymers is in a heat resistant, compatible resin composition comprising:

(a) a homopolymer of N-(2,3-dimethylphenyl) maleimide, a copolymer of N-(2,3-dimethylphenyl) maleimide, or a mixture thereof; and (b)(1) a polymer of one or more monomers selected from the group consisting of aromatic monoalkenyl monomers, vinyl cyano monomers, alkylester monomers of acrylic acid, alkylester monomers of methacrylic acid, vinyl halide monomers, and vinyl alkylester monomers;

(b)(2) a graft rubber copolymer of (i) a rubber polymer, (it) N-(2,3-dimethylphenyl) maleimide and, optionally, (iii) one or more comonomers selected from the group consisting of aromatic monoalkenyl monomers, vinyl cyano monomers, alkylester monomers of acrylic acid, alkylester monomers of methacrylic acid, vinyl halide monomers, and vinyl alkylester monomers; or (b)(3) a mixture of (b)(1) and (b)(2), wherein component (a) and component (b) are present in a ratio of 5:95 to 95:5 parts by weight, preferably 10:90 to 90:10 parts by weight, and especially 15:85 to 85:15 parts by weight, in the resin composition. Special mention is made of compositions comprising (a) a homopolymer of N-(2,3-dimethylphenyl)maleimide, and (b) a copolymer of styrene and acrylonitrile; and compositions comprising (a) a copolymer comprising poly-(N-(2,3-dimethylphenyl)maleimide-co-styrene) and (b) a copolymer of styrene and acrylonitrile.

In all such cases, it is also preferred that such compositions have a single glass transition temperature ($T_g$) as determined by DSC.

The heat resistant compositions may, in addition to components (a) and (b), comprise additives such as, for example, flame retardant agents, synergists for the flame retardant agents, drip retardant agents, pigments, dyes, heat stabilizers, antioxidants, plasticizers, lubricants, UV-stabilizers, processing aids, foaming agents, and the like in order to further improve the properties, including processability, of the compositions.

Suitable organic flame retardants typically include aromatic compounds containing halogens such as 1,2-bis(2,4, 6-tribromophenoxy)ethane, decabromodiphenyl oxide and octabromodiphenyl oxide, or mixtures thereof, aliphatic compounds containing halogens such as 2,2-bis(3,5-dichlorophenyl)propane and bis(2,6-dibromophenyl) methane, and cycloaliphatic compounds containing halogens such as bis(3,5-dichlorophenyl) cyclohexylmethane. Aromatic compounds are preferably used. The amount of the organic flame retardant preferably used is 5 to 40% by weight, more preferably 10 to 30% by weight, of the total amount of the resin composition. When the amount of organic flame retardant is less than 5% by weight of the total amount of the resin composition, sufficient flame retardance cannot be obtained. When the amount of organic flame retardant is over 40% by weight, not only does the organic flame retardant tend to sharply decrease the properties of the resin composition, but the manufacturing process also becomes too costly. As a suitable synergist may be mentioned antimony trioxide, which may be used in an amount of 1 to 20% by weight, preferably 1 to 15% by weight, based on the total weight of the resin composition. When the amount of antimony trioxide is less than 1% by weight of the total weight of the resin composition, sufficient flame retardance cannot be obtained because synergism of antimony trioxide with the organic flame retardant does not occur. When the amount of antimony trioxide is over 20% by weight, the impact strength of the resin composition decreases to an undesirable level.

Uses of Polyfunctional Maleimides

As indicated above, the polyfunctional maleimides in accordance with the present invention find use, for example, as replacements for currently used polyfunctional maleimide crosslinkers in a wide variety of applications, and particularly high temperature resistant applications.

For example, bis-maleimides are well-known components in composite and molding application. In addition, polyfunctional maleimides (including bis-maleimides) are well-known crosslinkers for rubber compositions.

This invention is further illustrated, but is not intended to be limited, by the following examples in which all parts are by weight.

EXAMPLE 1

Preparation of N-(2,3-dimethylphenyl) Maleimide Using t-Amyl Alcohol and Toluene as a Solvent Mixture In a suitable reaction vessel, 10.8 parts of maleic anhydride was partially dissolved in a mixed solvent composed of 121 parts of t-amyl alcohol and 43 parts of toluene. The solution was treated dropwise with 12.1 parts of 2,3-dimethylaniline dissolved in 16 parts of the same mixed solvent. After the addition was complete, 1.90 parts of p-toluenesulfonic acid was then added and the solution heated at reflux for four hours. The water byproduct was collected in a Dean-Stark trap. The solution was then allowed to cool to room temperature and the solvents removed by rotary evaporation. The crude product was dissolved in toluene, and washed first with aqueous sodium carbonate and then with dilute hydrochloric acid. The toluene solution was dried over anhydrous magnesium sulfate, filtered, and rotary evaporated leaving 18.6 parts (93%) of off-white solid.

EXAMPLE 2

Preparation of Poly-(N-(2,3-dimethylphenyl) Maleimide) (Free-radical Homopolymerization)

The monomer prepared in accordance with the procedure of Example 1 was polymerized in the presence of a free-radical-generating catalyst as follows: A solution of 40.2 parts of N-(2,3-dimethylphenyl) maleimide in 173 parts of toluene, and a solution of 0.33 pad of azobisisobutyronitrile (AIBN) in 17 parts of toluene, were sparged with nitrogen gas for 30 minutes. The monomer solution was heated to 60° C. and the AIBN solution was then rapidly added. The solution was stirred at 75°–80° C. for 18 hours under nitrogen, allowed to cool to room temperature, and poured as a fine stream into 1582 parts of rapidly-stirred methanol. The polymer was separated by suction filtration, washed with methanol on the filter, and dried giving 19.5 parts (49%) of light-yellow solid. The properties of the homopolymer are set forth in Table I, which follows.

EXAMPLE 3

Preparation of Poly(N-(2,3-dimethylphenyl) maleimide) by Anionic Polymerization

The monomer prepared in accordance with the procedure of Example 1 was polymerized in the presence of an anionic catalyst as follows: A solution of 10.1 parts of N-(2,3-dimethylphenyl) maleimide dissolved in 88.6 parts of tetrahydrofuran (THF) was sparged with nitrogen gas for 15 minutes. The solution was then cooled to −72° C. in an ethanol-dry ice bath, treated with 0.20 part of potassium t-butoxide, and stirred for 2 hours under nitrogen. The solution was then acidified with hydrochloric acid, allowed to warm to room temperature, and poured as a fine stream into 791 parts of rapidly-stirred methanol. The polymer was separated by suction filtration, washed on the filter, first with methanol, and then with water, and dried giving 9.85 parts (98%) of white solid. The properties of the homopolymer are set forth in Table I, which follows.

COMPARATIVE EXAMPLE 1

Preparation of Poly(N-phenyl maleimide) by Radical Polymerization

N-phenylmaleimide monomer was prepared in accordance with the procedure of Example 1, except that aniline was substituted 2,3-dimethylaniline. This monomer was polymerized in the presence of a free-radical-generating catalyst by the procedure of Example 2 with the following changes: 17.3 parts of N-phenylmaleimide dissolved in 130 parts of toluene, and 0.17 part of AIBN dissolved in 13 parts of toluene, were used and the reaction mixture was stirred at 60° C. for 18 hours. The polymer precipitated out of solution during heating and was separated from the reaction mixture by suction filtration. It was washed on the filter with methanol and dried giving 17.2 parts (99%) of white solid. The properties of the homopolymer are set forth in Table I, which follows.

TABLE I

PROPERTIES OF HOMOPOLYMERS

| EX. | Mw | Mw/Mn | Color | SOLUBILITY | | | | | |
|---|---|---|---|---|---|---|---|---|---|
| | | | | Tol | Ace | DMF | THF | Chl | Sty |
| 2 | 6,500 | 1.81 | pale yellow | S | S | S | S | S | S |
| 3 | 61,600 | 2.77 | white | S | S | S | S | S | S |
| C1 | — | — | white | I | I | S | I | I | I |

TOL = Toluene; Ace = Acetone; DMF = Dimethylformamide; Chl = Chloroform; Sty = Styrene; THF = tetrahydrofuran
S = soluble; PS = partly soluble; I = Insoluble The data in Table I indicate that the maleimide-containing homopolymer compositions of the present invention, Examples 2 and 3, are more soluble in common organic solvents than is the commercial product of choice, Comparative Example 1.

EXAMPLE 4

Preparation of Poly-(N-(2,3-dimethylpbenyl) Maleimide-co-Styrene) (50/50) (Batch Copolymerization)

The monomer prepared in accordance with the procedure of Example 1 was copolymerized with styrene monomer in a batch process as follows: A solution of 10.4 parts of styrene and 20.1 parts of N-(2,3-dimethylphenyl) maleimide in 173 parts of toluene, and a solution of 0.20 pad of AIBN in 13 parts of toluene, were sparged with nitrogen gas for 30 minutes. The solution of monomers was heated to 60° C. and then the AIBN solution was rapidly added. The reaction mixture was stirred at 60° C. for 18.5 hours under nitrogen. The copolymer solution was allowed to cool to room temperature and poured as a fine stream into 1582 parts of rapidly-stirred methanol. The copolymer was separated by suction filtration and dried. The copolymer was redissolved in 158 parts of acetone and added dropwise to 1187 parts of rapidly-stirred methanol. The copolymer was again separated by suction filtration, washed on the filter with methanol and dried giving 30.2 parts (99%) of white solid. The properties of the copolymer are set forth in Table II, which follows.

EXAMPLE 5

Preparation of Poly(N-(2,3-dimethylphenyl) maleimide-co-styrene)(50/50)(Continuous Polymerization)

The monomer prepared in accordance with the procedure of Example 1 was copolymerized with styrene monomer in a continuous process as follows: A solution of 5.21 parts of styrene, 0.17 pad of AIBN, and 10.1 parts of N-(2,3-dimethylphenyl) maleimide dissolved in 86.7 parts of toluene was sparged with nitrogen gas for 30 minutes. This solution was added dropwise to 43 parts of stirred toluene heated to 75° C. under nitrogen. The temperature was maintained at 75° C. during the addition and for one hour after the addition was complete. The solution was then allowed to cool to room temperature and poured as a fine stream into 1187 parts of rapidly-stirred methanol. The copolymer was separated by suction filtration, washed with methanol on the filter, and dried, giving 12.4 parts (81%) of white solid. The properties of the copolymer are set forth in Table II, which follows.

COMPARATIVE EXAMPLE 2

Preparation of Poly(N-phenyl maleimide-co-styrene)(50/50) (Batch Polymerization)

The monomer prepared with aniline in accordance with the procedure of Comparative Example 1 was copolymerized with styrene monomer in a batch process as follows: A solution of 10.4 parts of styrene and 17.3 parts of N-phenyl maleimide dissolved in 607 parts of toluene, and a solution of 0.16. pad of AIBN dissolved in 43 parts of toluene, were sparged with nitrogen gas for 30 minutes. The solution of monomers was heated to 50° C. and then the AIBN solution was rapidly added with stirring. The reaction mixture was stirred at 55°–60° C. for 20 hours under nitrogen. The copolymer precipitated out of solution during heating and was separated from the reaction mixture by suction filtration. The copolymer was washed on the filter with methanol and dried giving 26.3 parts (95%) of white solid. The properties of the copolymer are set forth in Table II, which follows.

COMPARATIVE EXAMPLE 3

For comparison purposes a commercial sample of styrene/acrylonitrile (SAN) from Monsanto Co. is designated as Comparative Example 3. The properties of this copolymer are also set forth in Table II, which follows.

TABLE II

PROPERTIES OF COPOLYMERS

| EX. | Mw | Mw/Mn | $T_g$, °C. | Color | SOLUBILITY | | | | | |
|---|---|---|---|---|---|---|---|---|---|---|
| | | | | | Tol | Ace | DMF | THF | Chl | Sty |
| 4 | 152,700 | 2.84 | 229 | off white | PS | S | S | S | S | S |
| 5 | 69,390 | 2.41 | 231 | white | S | S | S | S | S | S |
| C2 | 122,900 | 2.64 | 225 | white | I | PS | S | S | S | I |
| C3 | 188,400 | 2.48 | 105 | none | S | S | S | S | S | S |

TOL = Toluene; Ace = Acetone; DMF = Dimethylformamide; Chl = Chloroform; Sty = Styrene; THF = tetrahydrofuran
S = soluble; PS = partly soluble; I = Insoluble The data in Table II indicate that the maleimide-containing copolymer compositions of the present invention, Examples 4 and 5, are more soluble in common organic solvents than is the current commercial product of choice, Comparative Example 2, and further that they should be more compatible with the commercial SAN copolymer, Comparative Example 3, when used therewith to form heat resistant compositions in accordance with the present invention.

EXAMPLE 6

Preparation of a Blend of Poly-(N-(2,3-dimethylphenyl) Maleimide) and Poly-(Styrene-co-Acrylonitrile) (25/75)

The homopolymer prepared in accordance with the procedure of Example 3 and the SAN copolymer of Comparative Example 3 were both dissolved in DMF and/or acetone. This solution was added dropwise to methanol and the precipitated blend was separated by suction filtration and dried. The glass transition temperature ($T_g$) was determined by differential scanning calorimetry (DSC). The properties of the blended copolymer composition are set forth in Table III, which follows.

EXAMPLE 7

Preparation of a Blend of Poly-(N-(2,3-dimethylphenyl) Maleimide) and Poly-(Styrene-co-Acrylonitrile) (50/50)

The homopolymer prepared in accordance with the procedure of Example 3 and the SAN copolymer of Comparative Example 3 were blended in accordance with the procedure of Example 6. The glass transition temperature was determined by the same method as used in Example 6. The properties of the blended copolymer composition are set forth in Table III, which follows.

COMPARATIVE EXAMPLE 4

Preparation of a Blend of Poly-(N-Phenyl Maleimide) and Poly-(Styrene-co-Acrylonitrile) (50/50)

The homopolymer prepared in accordance with the procedure of Comparative Example 1 and the SAN copolymer of Comparative Example 3 were blended in accordance with the procedure of Example 6. The glass transition temperature was determined by the same method as used in Example 6. The properties of the blended copolymer composition are set forth in Table III, which follows.

EXAMPLE 8

Preparation of a Blend of Poly-(N-(2,3-dimethylphenyl) Maleimide-co-Styrene) and Poly-(Strene-co-Acrylonitrile) (50/50)

The copolymer prepared in accordance with the procedure of Example 4 and the SAN copolymer of Comparative Example 3 were blended in accordance with the procedure of Example 6. The glass transition temperature was determined by the same method used in Example 6. The properties of the blended copolymer composition are set forth in Table III, which follows.

COMPARATIVE EXAMPLE 5

Preparation of a Blend of Poly(N-Phenyl maleimide-co-styrene)/Poly(styrene-co-acrylonitrile) (50/50)

The copolymer prepared in accordance with the procedure of Comparative Example 2 and the SAN copolymer of Comparative Example 3 were blended in accordance with the procedure of Example 6. The glass transition temperature was determined by the same method used in Example 6. The properties of the blended copolymer composition are set forth in Table III, which follows.

TABLE III

PROPERTIES OF HOMOPOLYMER AND COPOLYMER BLENDS

| EX. | Tg, °C. | Color | SOLUBILITY | | | | | |
|---|---|---|---|---|---|---|---|---|
| | | | Tol | Ace | DMF | THF | Chl | Sty |
| C3 | 105 | none | S | S | S | S | S | S |
| 6 | 110 | white | PS | S | S | S | S | S |
| 7 | 116 | white | PS | S | S | S | S | S |
| C4 | 114 | white | PS | PS | S | PS | PS | PS |
| 8 | 135 | white | PS | S | S | S | S | S |
| C5 | 148 | white | PS | PS | S | S | S | PS |

TOL = Toluene; Ace = Acetone; DMF = Dimethylformamide; Chl = Chloroform; Sty = Styrene; THF = tetrahydrofuran
S = soluble; PS = partly soluble; I = Insoluble The data in Table III indicate that the blended maleimide-containing homo- and co-polymer compositions of the present invention, Examples 6–8, are more soluble in common organic solvents than those containing the current commercial product of choice, Comparative Examples 4 and 5, and further that they are more compatible with the commercial SAN copolymer when used therewith to form heat resistant compositions in accordance with the present invention.

EXAMPLE 9

Preparation of 4,4'-Methylenebis(2,3-dimethylaniline)

In a suitable reaction vessel, 66.6 parts of 2,3-dimethylaniline were dissolved in a solution of 60 parts concentrated hydrochloric acid and 300 parts water. To the stirred solution was added 20.3 parts of 37% aqueous formaldehyde solution, and then the combination heated at reflux for 2.5 hours. The result was then made basic by adding 26 parts of solid sodium hydroxide and steam distilled until all unreacted 2,3-dimethylaniline was removed. The crude product was separated by suction filtration and dried giving 62.5 parts (98%) of a tan solid having a melting point of 120°–135° C. The crude product contained 16% (area percent as determined by HPSEC) oligomeric material which could be substantially removed (to less than 1 area %) by recrystallization to leave an off-white product having a melting point of 141°–143° C.

The recrystallized compound was characterized by FTIR and proton NMR as follows: IR(KBR): 3408 cm$^{-1}$, 3336 cm$^{-1}$, 3012 cm$^{-1}$, 2909 cm$^{-1}$, 1597 cm$^{-1}$ $^1$H NMR(CDCl$_3$) δ6.52(dd,4H), 3.79(s,2H), 2.15(s,6H), 2.11(s,6H).

EXAMPLE 10

Preparation of "Oliqomeric" 4,4'-Methylenebis(1-maleimido-2,3-dimethylbenzene)

In a suitable reaction vessel, 25.4 parts of the crude product from Example 10 were added to a cooled (5° C.), stirred solution of 21.6 parts of maleic anhydride dissolved in a mixture of 325 parts of toluene and 100 parts of t-amyl alcohol. The reaction mixture was stirred for 30 minutes, after which was added 0.95 parts of p-toluenesulfonic acid and heated to reflux. 23.6 parts of dimethylformamide were added and the resulting mixture heated at reflux for 5 hours. Any water that formed was removed by azeotropic distillation using a Dean-Stark water separator. The reaction mixture was allowed to cool, then extracted first with aqueous sodium carbonate and then with dilute hydrochloric acid. The organic solution was dried with anhydrous magnesium sulfate and filtered. The solvent was removed by rotary evaporation leaving 31.4 parts (76%) of a pale yellow solid having a melting point of about 210°–220° C.

EXAMPLE 11

Preparation of "Pure" 4,4'-Methylenebis(1-maleimido-2,3-dimethylbenzene)

In a suitable reaction vessel, to a stirred suspension of 12.7 parts of the recrystallized product of Example 10 in 78.6 parts of t-butanol was added dropwise 10.0 parts of maleic anhydride dissolved in 78.6 parts of t-butanol. 1.9 parts of p-toluenesulfonic acid was then added, and the reaction mixture heated to and maintained at reflux for 19 hours. Any water formed was removed as an azeotrope, which was continuously dried with 3Å molecular sieves and returned to the reaction vessel. When the reaction was complete, the solvent was removed by rotary evaporation and the crude product dissolved in chloroform. The chloroform solution was first washed with aqueous sodium carbonate and then with dilute hydrochloric acid. Finally, the solution was dried with anhydrous magnesium sulfate, filtered and rotary evaporated, leaving 20.1 parts (97%) of a yellow solid melting at 233°–237° C.

The resulting product was characterized by FTIR and proton NMR as follows: IR(KBR): 3093 cm$^{-1}$, 2994 cm$^{-1}$, 2917 cm$^{-1}$, 1710 cm$^{-1}$, 1587 cm$^{-1}$, 1393 $^{-1}$ $^1$H NMR(CDCl$_3$) δ6.86(m,8H), 3.99(s,2H), 2.23(s,6H), 2.08(s, 6H).

Many variations of the present invention will suggest themselves to those skilled in this art in light of the above, detailed description. All such obvious variations are within the full intended scope of the appended claims.

We claim:

1. A polyfunctional maleimide of the general formula

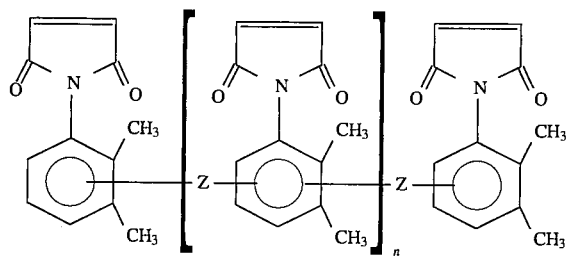

wherein n is 0 or larger; and Z is selected from an alkylene group, an alkyl substituted alkylene group and a dialkyl substituted alkylene group.

2. The polyfunctional maleimide of claim 1, wherein n is 0, 1 or 2, and the alkylene group of Z is a methylene group.

3. The polyfunctional maleimide of claim 2, wherein n is 0.

4. The polyfunctional maleimide of claim 3, which is 4,4'-methylenebis(1-maleimido-2,3-dimethylbenzene).

5. A curable composition comprising, as a component, a polyfunctional maleimide of the general formula

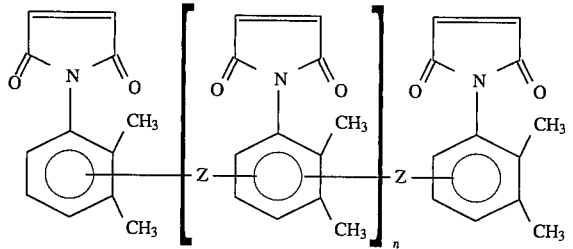

wherein n is 0 or larger; and Z is selected from an alkylene group, an alkyl substituted alkylene group and a dialkyl substituted alkylene group.

6. The curable composition of claim 5, wherein n is 0, 1 or 2, and the alkylene group of Z is a methylene group.

7. The curable composition of claim 6, wherein n is 0.

8. The curable composition of claim 7, wherein the polyfunctional maleimide is 4,4'-methylenebis(1-maleimido-2,3-dimethylbenzene).

9. The curable rubber composition comprising, as crosslinker, a polyfunctional maleimide of the general formula

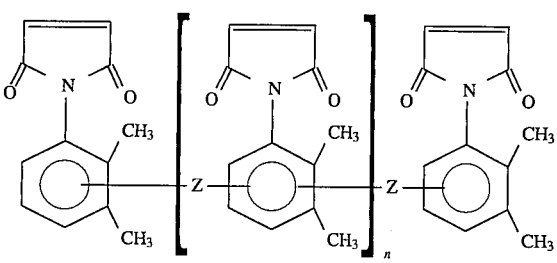

wherein n is 0 or larger; and Z is selected from an alkylene group, an alkyl substituted alkylene group and a dialkyl substituted alkylene group.

10. The curable rubber composition of claim 9, wherein n is 0, 1 or 2, and the alkylene group of Z is a methylene group.

11. The curable rubber composition of claim 10, wherein n is 0.

12. The curable rubber composition of claim 11, wherein the polyfunctional maleimide is 4,4'-methylenebis(1-maleimido-2,3-dimethylbenzene).

* * * * *